US011687089B2

(12) United States Patent
Takahashi et al.

(10) Patent No.: US 11,687,089 B2
(45) Date of Patent: Jun. 27, 2023

(54) ENVIRONMENTAL INFORMATION UPDATE APPARATUS, ENVIRONMENTAL INFORMATION UPDATE METHOD, AND PROGRAM FOR UPDATING INFORMATION REGARDING AN OBSTACLE IN A SPACE

(71) Applicant: SONY CORPORATION, Tokyo (JP)

(72) Inventors: Ryo Takahashi, Tokyo (JP); Chao Wang, Tokyo (JP); Dai Kobayashi, Tokyo (JP); Masataka Toyoura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 547 days.

(21) Appl. No.: 16/651,139

(22) PCT Filed: Jul. 11, 2018

(86) PCT No.: PCT/JP2018/026133
§ 371 (c)(1),
(2) Date: Mar. 26, 2020

(87) PCT Pub. No.: WO2019/069524
PCT Pub. Date: Apr. 11, 2019

(65) Prior Publication Data
US 2020/0241554 A1 Jul. 30, 2020

(30) Foreign Application Priority Data
Oct. 2, 2017 (JP) .................................. 2017-192627

(51) Int. Cl.
G05D 1/02 (2020.01)

(52) U.S. Cl.
CPC ......... G05D 1/0274 (2013.01); G05D 1/0217 (2013.01); G05D 1/0238 (2013.01); G05D 2201/0207 (2013.01)

(58) Field of Classification Search
CPC ... G05D 1/0274; G05D 1/0217; G05D 1/0238
See application file for complete search history.

(56) References Cited

U.S. PATENT DOCUMENTS 9,339,163 B2 * 5/2016 Noh ..................... G05D 1/0231
2006/0241827 A1 * 10/2006 Fukuchi ............... G05D 1/0274
701/23

(Continued)

FOREIGN PATENT DOCUMENTS

CN    1617170 A    5/2005
CN   105182979 A   12/2015

(Continued)

Primary Examiner — Ramsey Refai
(74) Attorney, Agent, or Firm — Paratus Law Group, PLLC

(57) ABSTRACT

Information regarding an obstacle region and information regarding an empty region are optimally updated to minimize an information amount. In the obstacle region, an obstacle exists in space where a mobile body moves. In the empty region, an obstacle does not exist. According to the disclosure, there is provided an environmental information update apparatus including an update unit that updates information regarding an obstacle region and information regarding an empty region, an obstacle existing in space where a mobile body moves in the obstacle region, the obstacle not existing in the empty region, in which the update unit updates the obstacle region, and updates the empty region on the basis of different periods of elapsed time.

13 Claims, 17 Drawing Sheets

(56) References Cited

U.S. PATENT DOCUMENTS

2010/0070078 A1* 3/2010 Kong .................. G05D 1/0274
901/1
2015/0157182 A1 6/2015 Noh et al.

FOREIGN PATENT DOCUMENTS

| EP | 2952993 A1 | 12/2015 |
|----|------------|---------|
| JP | 2005-332204 A | 12/2005 |
| JP | 2006-023440 A | 1/2006 |
| JP | 2007-233764 A | 9/2007 |
| JP | 2009-169845 A | 7/2009 |
| JP | 2009-301401 A | 12/2009 |
| JP | 2011-150473 A | 8/2011 |
| WO | WO 2011/026119 A2 | 3/2011 |

* cited by examiner

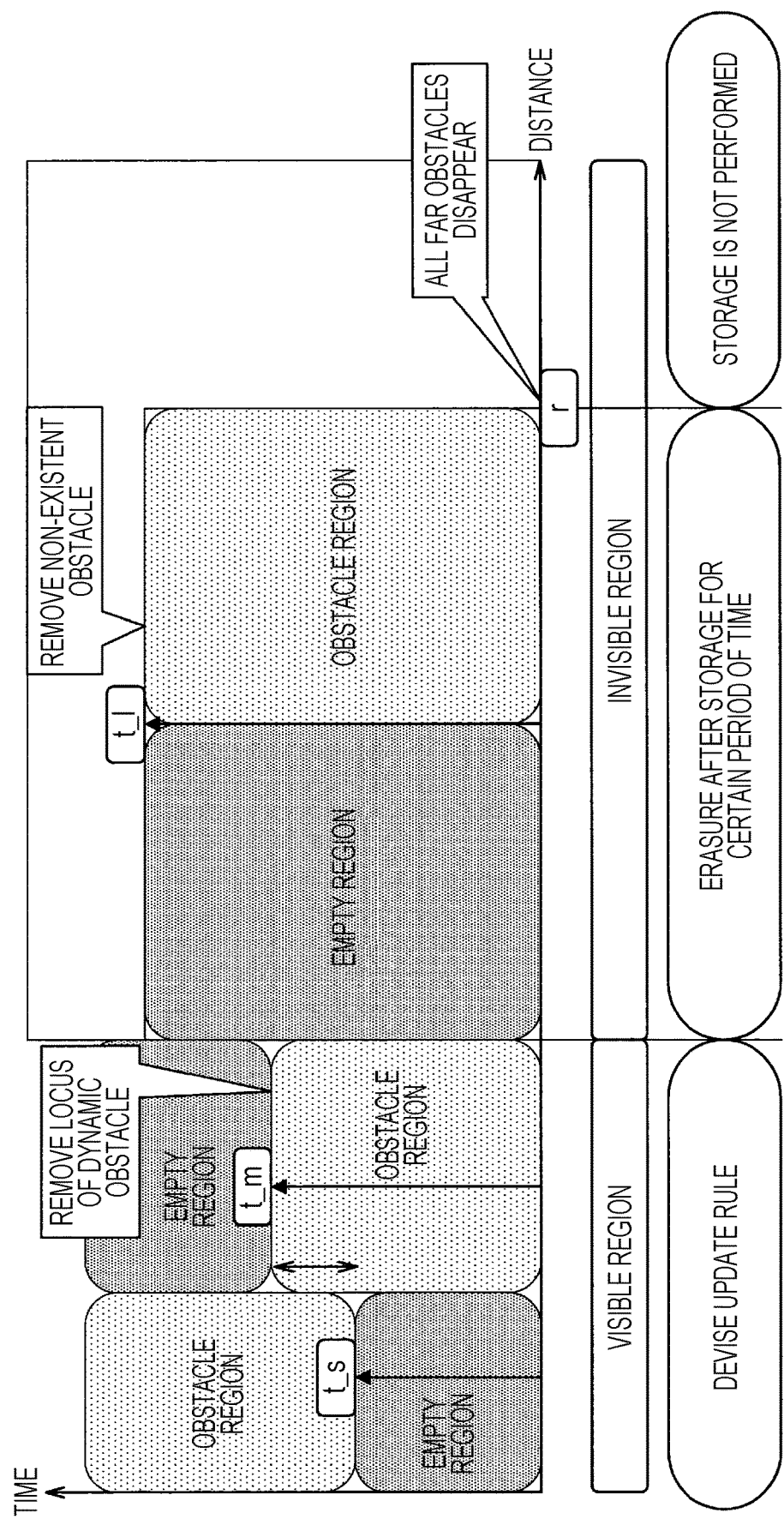

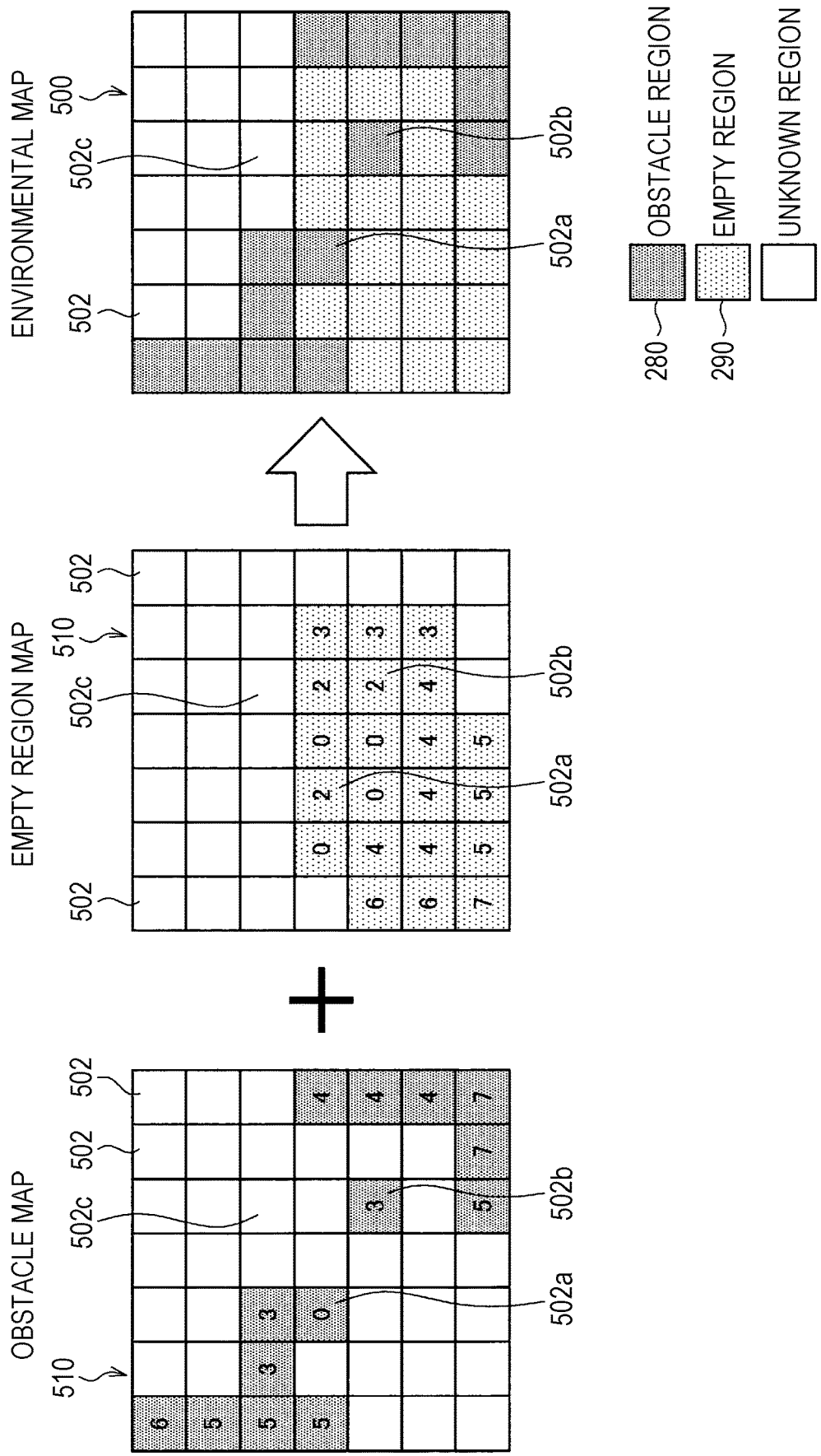

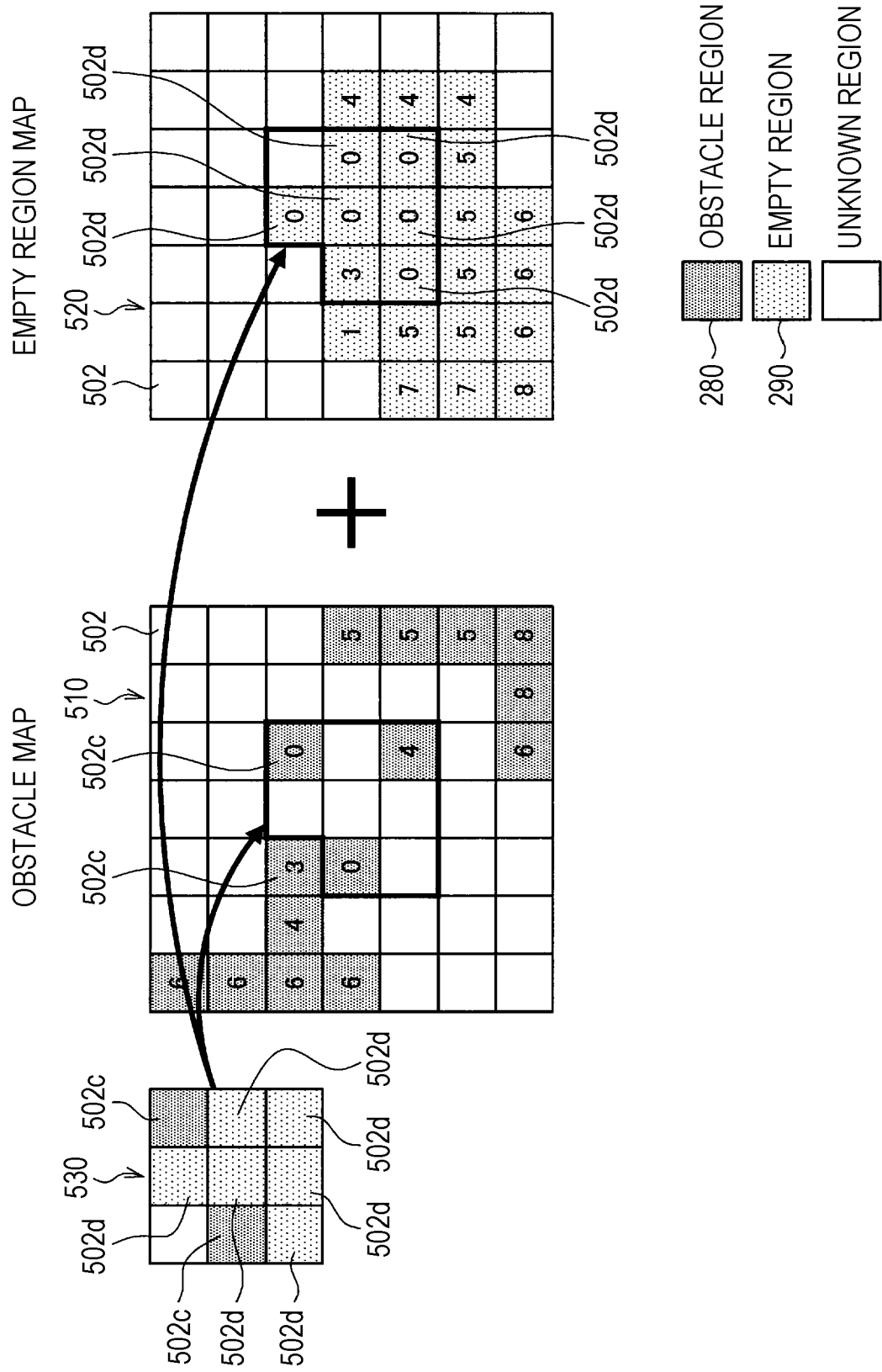

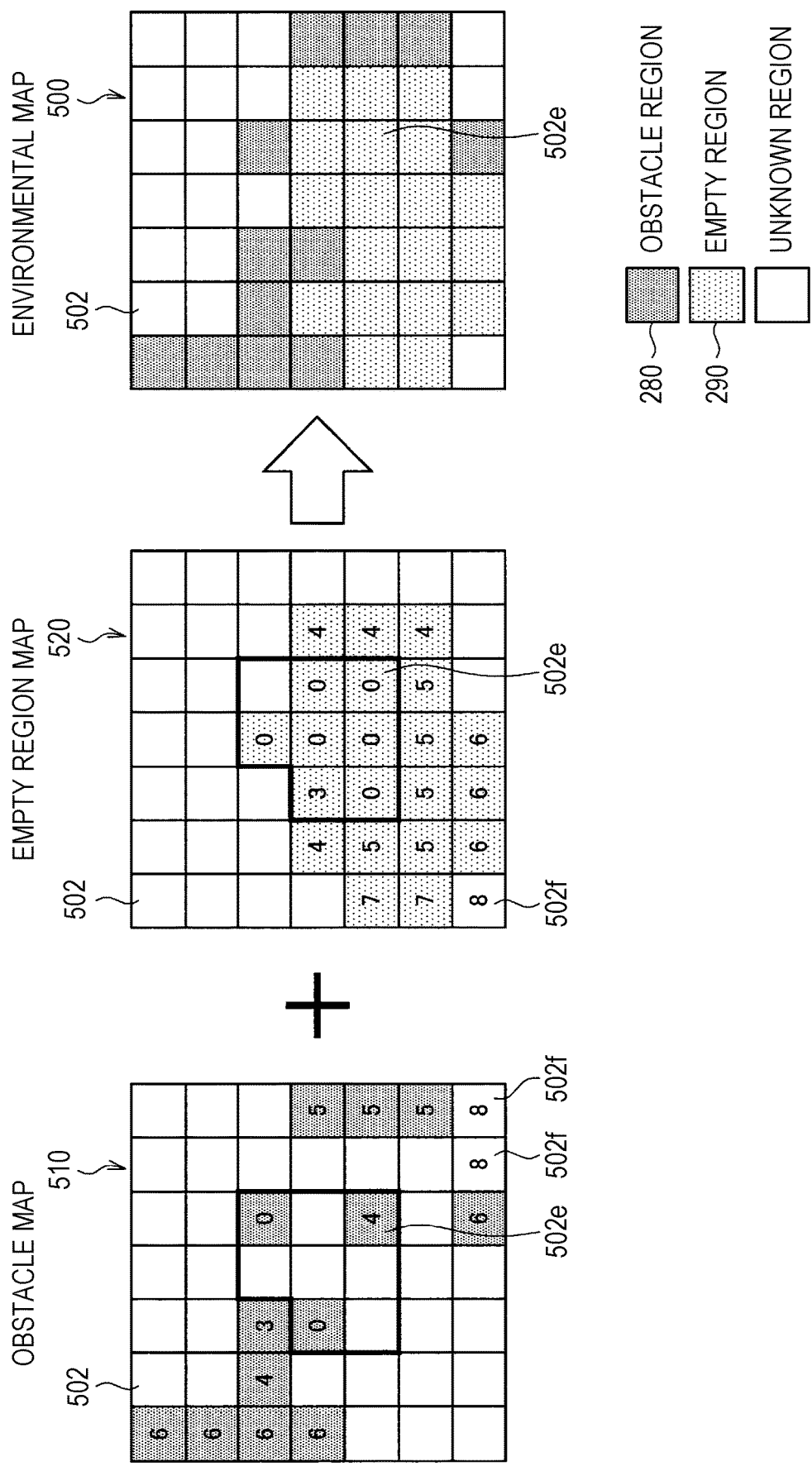

FIG. 11
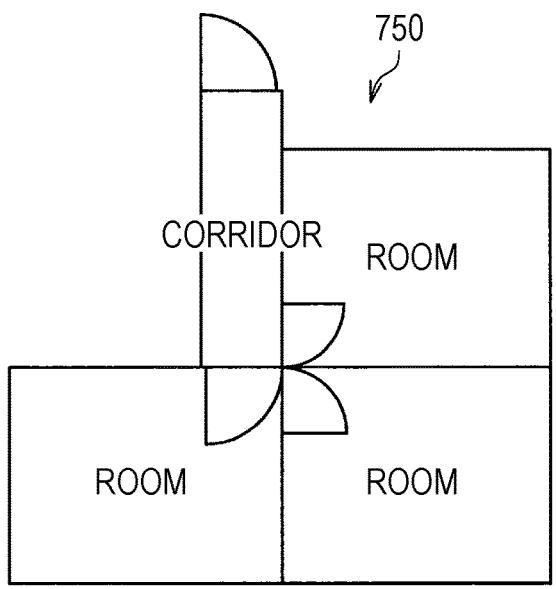
FLOOR PLAN OF MOVEMENT SPACE
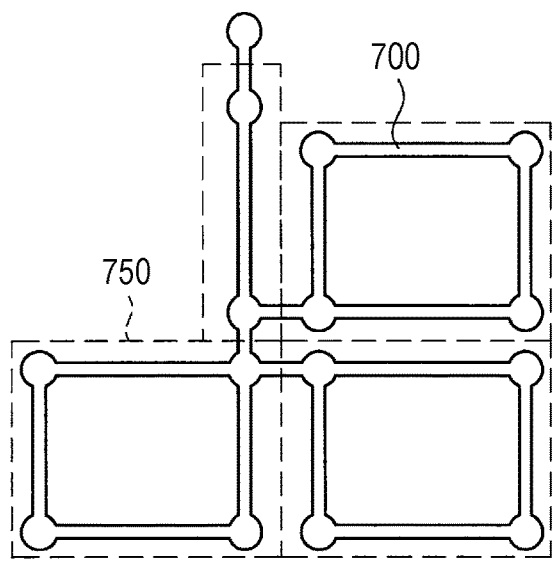
TOPOLOGICAL MAP
(INFORMATION REGARDING
CONNECTION BETWEEN ROOMS)

FIG. 15
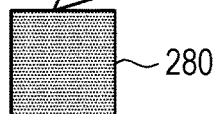 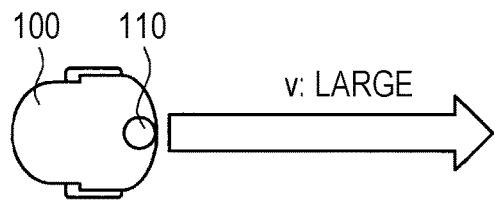
 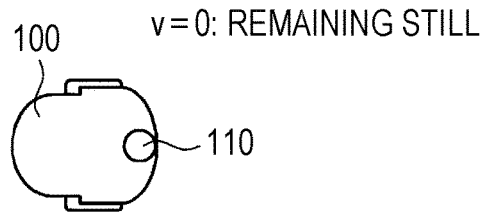
FIG. 16
 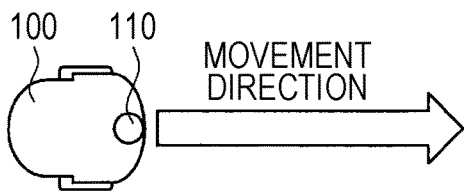

ENVIRONMENTAL INFORMATION UPDATE APPARATUS, ENVIRONMENTAL INFORMATION UPDATE METHOD, AND PROGRAM FOR UPDATING INFORMATION REGARDING AN OBSTACLE IN A SPACE

CROSS REFERENCE TO PRIOR APPLICATION

This application is a National Stage Patent Application of PCT International Patent Application No. PCT/JP2018/026133 (filed on Jul. 11, 2018) under 35 U.S.C. § 371, which claims priority to Japanese Patent Application No. 2017-192627 (filed on Oct. 2, 2017), which are all hereby incorporated by reference in their entirety.

TECHNICAL FIELD

The present disclosure relates to an environmental information update apparatus, an environmental information update method, and a program.

BACKGROUND ART

Traditionally, Patent Document 1 below describes a technique in which it is assumed that a mobile body is correctively moved along a target route and control is performed for the mobile body to avoid an unexpected obstacle on the target route.

Patent Document 1 describes generating an environmental map around a mobile body cumulatively in a movement direction in consideration of the presence of an object along with movement of the mobile body, and determining the course, which does not interfere the object, of the mobile body on the basis of target route information and the environmental map.

Furthermore, Patent Document 2 below describes a technique related to an autonomous mobile body. In the technique, it is assumed that efficient movement is performed by removing a ghost of a moving obstacle at the right time. Furthermore, Patent Document 3 below describes a technique related to detection of an obstacle. In the technique, it is assumed that, even if there is a shielded part where a mounted sensor cannot detect an obstacle, the shielded part is appropriately addressed.

CITATION LIST

Patent Document

Patent Document 1: Japanese Patent Application Laid-Open No. 2005-332204
Patent Document 2: Japanese Patent Application Laid-Open No. 2011-150473
Patent Document. 3: Japanese Patent Application Laid-Open No. 2007-233764

SUMMARY OF THE INVENTION

Problems to be Solved by the Invention

Unfortunately, the technique described in Patent Document 1 above has a problem that a calculation amount is enormous since ail pieces of observation data is stored and the presence or absence of an object is determined by voting or probabilistic processing. For this reason, the technique has difficulty in being applied to a small mobile robot, or the like.

Furthermore, the technique described in Patent Document 2 above first determines whether or not an observed obstacle is a dynamic obstacle. In a case of determining that the observed obstacle is a dynamic obstacle, the technique erases the obstacle after a certain period of time even in a case where no re-observation is performed since the obstacle is highly likely to move from that place after a period of time. Unfortunately, recognition of dynamic obstacles requires certain computer resources, which is sometimes difficult to be applied to a small robot. Furthermore, in an environment such as a home where a static obstacle frequently moves over time, it is difficult to reduce a storage amount and widen a movement range.

Furthermore, the technique described in Patent Document 3 above is an approach using data obtained by re-observation. In a case where an obstacle has changed to a released region at the time of re-observation, the technique erases this. Unfortunately, in this approach, a far obstacle map that is not re-observed continues to remain.

As described above, a small mobile robot does not have sufficient computer resources, so that an approach capable of determining whether or not an obstacle is erased/stored with a lower load is required. Furthermore, since the positions of static obstacles frequently change in a human living environment, an approach capable of erasing a static obstacle that does not exist is necessary. Moreover, an obstacle at a far place where a mobile robot never go and old observation information are unreliable, so that those are desirably erased.

Then, it has been required to optimally update information regarding an obstacle region and information regarding an empty region to minimize an information amount. In the obstacle region, an obstacle exists in space where a mobile body moves. In the empty region, an obstacle does not exist.

Solutions to Problems

According to the disclosure, there is provided an environmental information update apparatus including an update unit that updates information regarding an obstacle region and information regarding an empty region, an obstacle existing in space where a mobile body moves in the obstacle region, the obstacle not existing in the empty region, in which the update unit updates the obstacle region, and updates the empty region on the basis of different periods of elapsed time.

Furthermore, according to the disclosure, there is provided an environmental information update method including updating information regarding an obstacle region and information regarding an empty region, an obstacle existing in space where a mobile body moves in the obstacle region, the obstacle not existing in the empty region, in which updating the obstacle region and updating the empty region are performed on the basis of different periods of elapsed time.

Furthermore, according to the disclosure, there is provided a program causing a computer to function as: means for updating information regarding an obstacle region and information regarding an empty region, an obstacle existing in space where a mobile body moves in the obstacle region, the obstacle not existing in the empty region; and means for updating the obstacle region, and updating the empty region on the basis of different periods of elapsed time.

Effects of the Invention

As described above, according to the disclosure, it is made possible to optimally update information regarding an obstacle region and information regarding an empty region to minimize an information amount. In the obstacle region, an obstacle exists in space where a mobile body moves. In the empty region, an obstacle does not exist.

Note that the above-described effect is not necessarily limited, and, along with or in place of the above-described effect, any of the effects illustrated in the present specification, or other effects that can be grasped from the specification may be exhibited.

BRIEF DESCRIPTION OF DRAWINGS

FIG. 9 is a schematic diagram illustrating how information regarding an empty region and an obstacle changes in accordance with elapsed time and a distance in each of a visible region and an invisible region.

FIG. 10A is a schematic diagram for illustrating creation of an environmental map, and illustrating a region, centered on a mobile robot, as seen from above, with the region being divided into a plurality of square regions.

FIG. 10B is a schematic diagram for illustrating the creation of the environmental map, and illustrating the region, centered on the mobile robot, as seen from above, with the region being divided into the plurality of square regions.

FIG. 10C is a schematic diagram for illustrating the creation of the environmental map, and illustrating the region, centered on the mobile robot, as seen from above, with the region being divided into the plurality of square regions.

FIG. 11 is a schematic diagram illustrating a floor plan of rooms and a corridor of movement space and a topological map corresponding to the floor plan.

FIG. 15 is a schematic diagram illustrating erasure of obstacle information in accordance with a speed of the mobile robot.

FIG. 16 is a schematic diagram illustrating the possibility of an obstacle, in a traveling direction of the mobile robot, being used in route planning of the mobile robot.

MODE FOR CARRYING OUT THE INVENTION

A preferred embodiment of the disclosure will be described in detail below with reference to the accompanying drawings. Note that, in the specification and the drawings, components having substantially the same functional configuration will be assigned the same signs and redundant description will be omitted.

Note that the description will be given in the following order.

Figure 1:
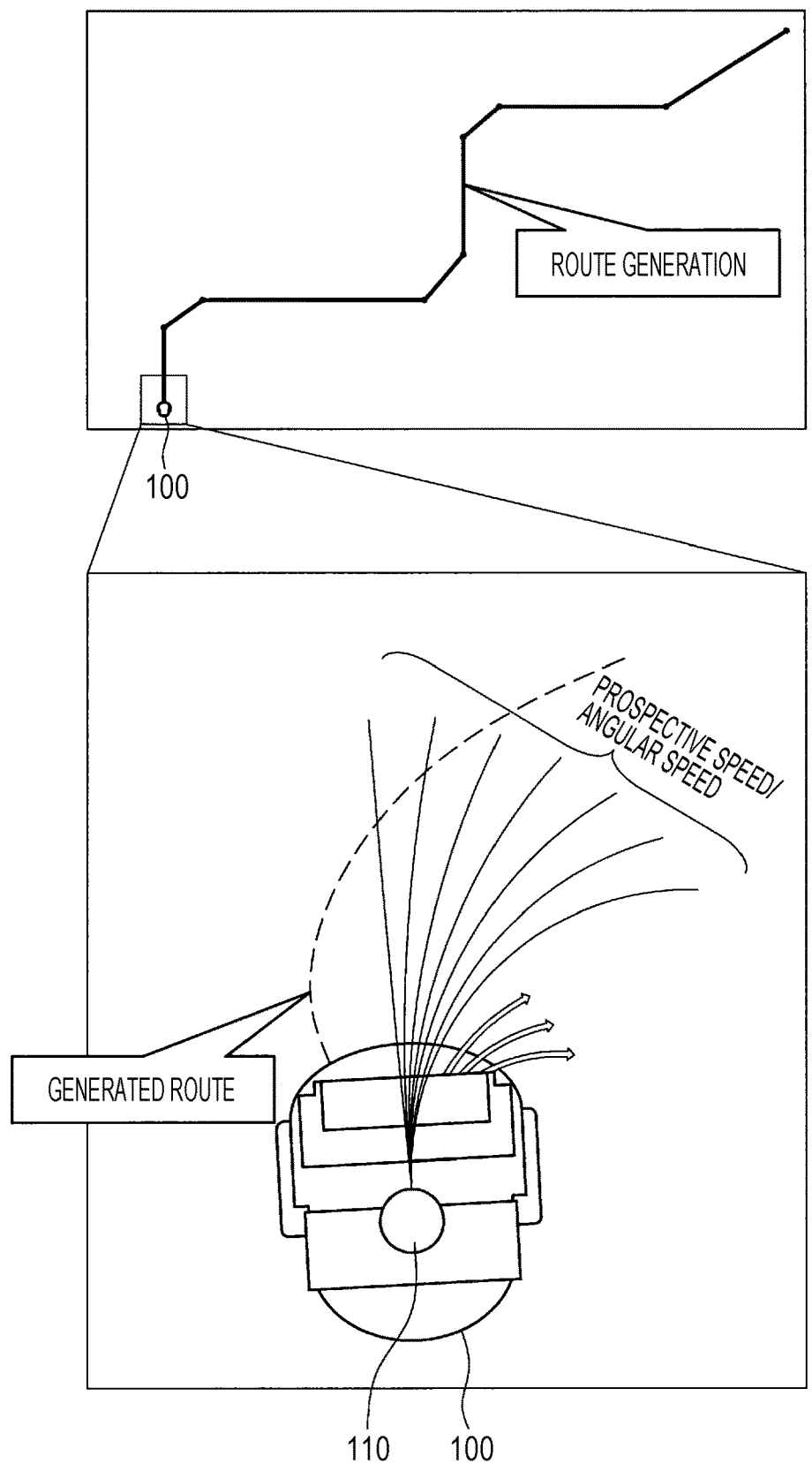
FIG. 1 is a schematic diagram illustrating route generation and route tracking in a movement plan of a self-supporting mobile robot.

1. Outline
2. Configuration Example of System
3. Processing Performed in a System According to the Embodiment
   3.1. Trimming of Outside of Certain Distance Range
   3.2. Map Integration
   3.3. Update of Visible Range
   3.4. Update of Invisible Range
   3.5. Composition and Output of Map
4. Change of Obstacle Region and Empty Region in Accordance with Elapsed Time and Distance
5. Specific Examples of Update of Environmental Map
6. How to Determine Each Parameter
   6.1. How to Determine Predetermined Value r
   6.2. How to Determine t_m
   6.3. How to Determine t_l 1. Outline FIG. 1 is a schematic diagram outlining route generation and route tracking in a movement plan of a self-supporting mobile robot 100 (mobile body). In a case where the mobile robot 100 moves, a target route to a destination is often calculated and generated first, and the mobile robot 100 travels to track the target route. At this time, environment is commonly measured with a distance sensor to generate a route in which the mobile robot avoids an obstacle and to calculate a speed at which the mobile robot 100 does not hit a surrounding obstacle.

Figure 2:
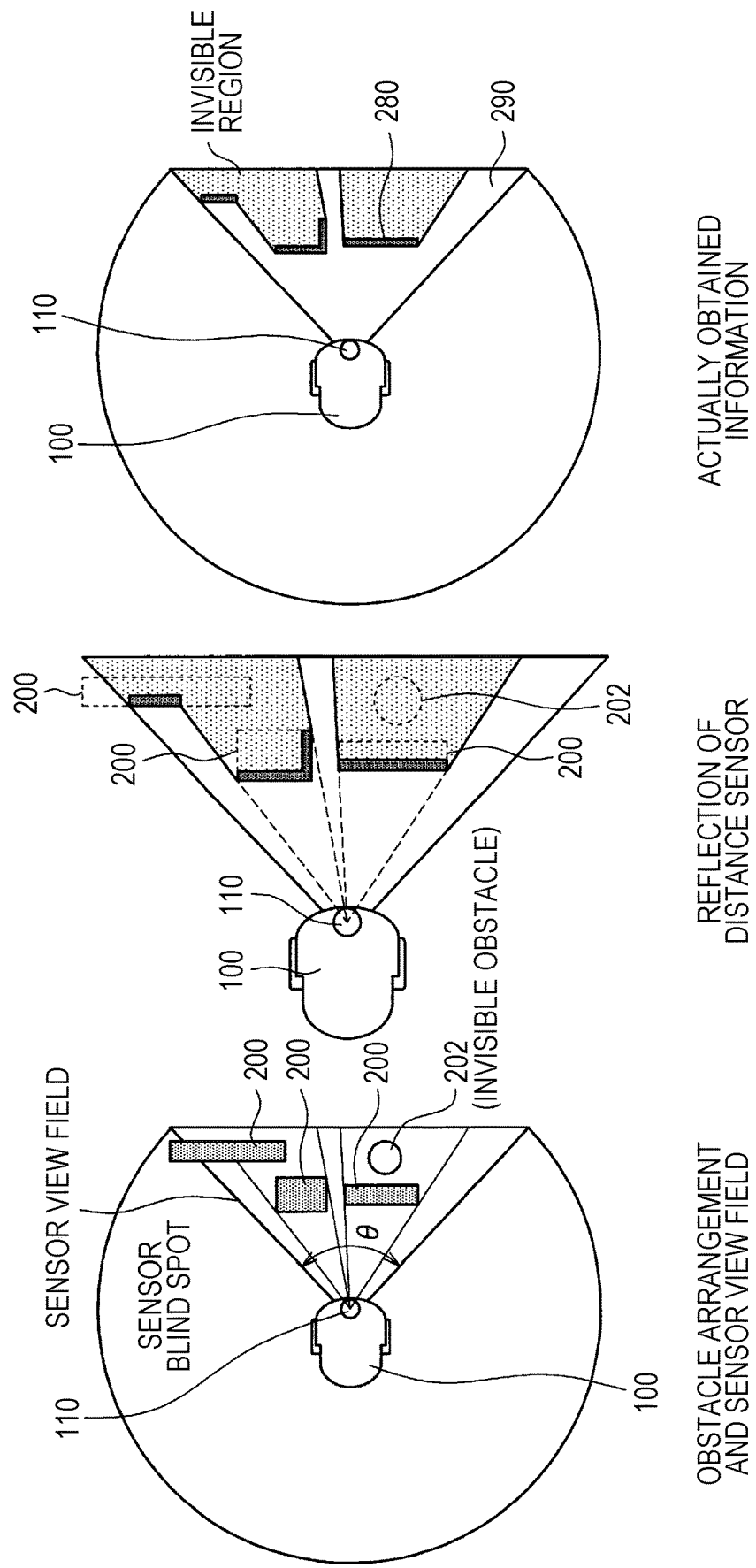
FIG. 2 is a schematic diagram illustrating a field of view of the mobile robot obtained by detection of an obstacle in a case where a distance sensor provided in the mobile robot detects the obstacle.

FIG. 2 is a schematic diagram illustrating a field of view of the mobile robot 100 obtained by detection of an obstacle 200 in a case where a distance sensor 110 provided in the mobile robot 100 detects the obstacle 200. Information regarding the field of view is hereinafter also referred to as environmental information. FIG. 2 illustrates the mobile robot 100 as seen from above. The mobile robot 100 can acquire the current distance from the mobile robot 100 itself to the obstacle 200 with the distance sensor 110. The distance sensor 110 generally measures the distance to a target object (obstacle 200) using a wave phenomenon with straightness such as phenomena by sound and light, and thus the distance sensor 110 can detect only the obstacle 200 closest to the distance sensor 110 on a line radiated from the distance sensor 110. The distance sensor 110 cannot measure the interior of the obstacle 200 nor an obstacle 202 behind the obstacle 200.

As illustrated in the left diagram in FIG. 2, the mobile robot 100 has a field of view in the range of an angle θ, and the other region is defined as a blind spot. The obstacles 200 are in front of the mobile robot 100. Furthermore, the invisible obstacle 202 is behind the obstacle 200.

As illustrated in the central diagram in FIG. 2, the distance sensor 110 detects the obstacles 200. At this time, the distance sensor 110 cannot perform observation in the hatched region due to the obstacles 200 serving as barriers, and thus the invisible obstacle 202 is not observed.

The right diagram in FIG. 2 illustrates information actually obtained by the observation performed by the distance sensor 110. The hatched region is an "invisible region", which is not observed by the distance sensor 110. Furthermore, information regarding the region where the distance sensor 110 observes the obstacle 200 is obtained as information regarding an obstacle region 280. Furthermore, information regarding the region closer to the mobile robot 100 than the obstacle region 280 is obtained as information regarding an empty region 290.

If movement to a destination is tried while avoiding the obstacle 200 by using only "current environmental information", which is the very output obtained from the distance sensor 110, problems such as the following a to c occur.

a. The obstacle 200 may be missed due to noise of the distance sensor 110

Since signals of the distance sensor 110 include noise, the current observation information from the distance sensor 110 is not always correct. Noise may cause the mobile robot 100 to falsely recognize a location where the obstacle 200 actually exists as the empty region 290. For this reason, it is safer for the mobile robot 100 to store and hold the obstacle 200 that has been recognized even once.

b. There is a possibility of collision against the obstacle 200 in the blind spot of the mobile robot 100

Figure 3:
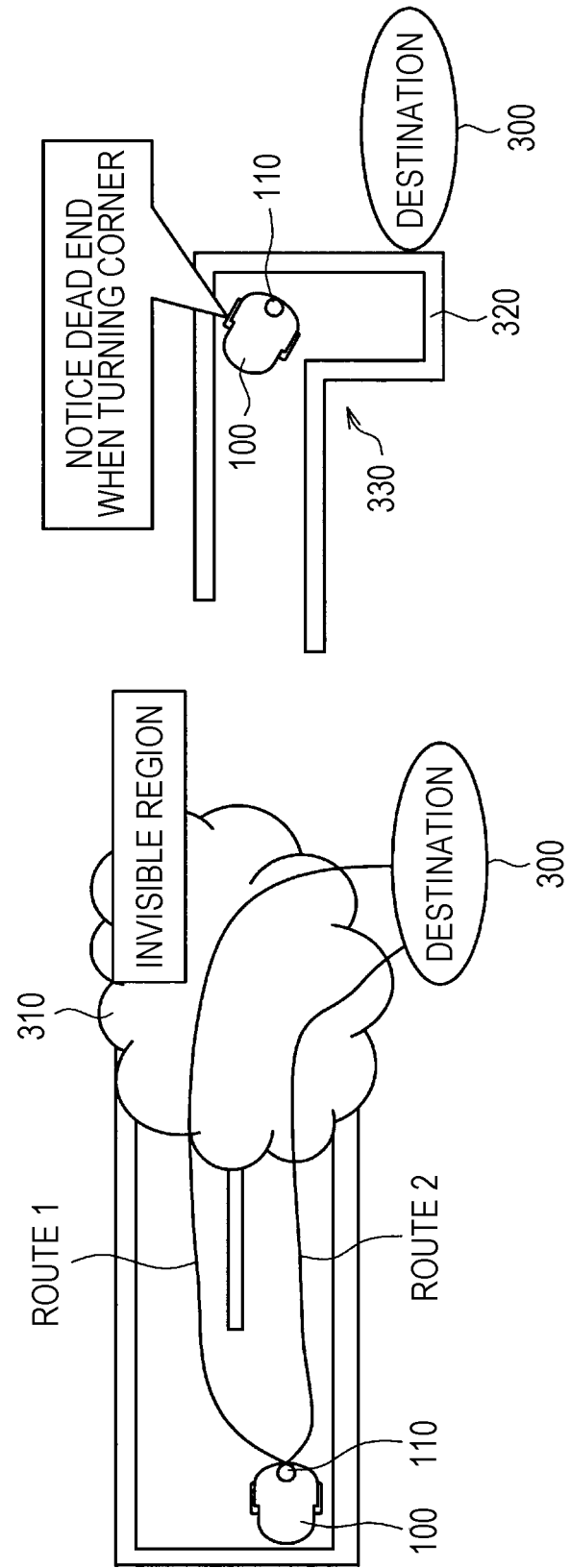
FIG. 3 is a schematic diagram illustrating a case where there are a route 1 and a route 2 to a destination and a region, which the distance sensor cannot recognize, is placed between the mobile robot and the destination.

For example, in a case where the distance sensor 110 detects "a person standing on the other side of a corner" with respect to the mobile robot 100, the person cannot be detected until the mobile robot 100 fully turns the corner and a shield (corner in the case) between the person and the distance sensor 110 is absent. In a case where the mobile robot 100 has a movement speed high to some extent, the mobile robot 100 may fail to decelerate after turning the corner and detecting the person, and collide with the person.

c. A correct movement route cannot be drawn without information regarding a far place In the route generation performed by the mobile robot 100, the route to be tracked by the mobile robot 100 is calculated to a far destination. The shortest route generated by the mobile robot 100 without information regarding a far place, however, may actually reach a dead end, from which the mobile robot 100 cannot reach the destination. FIG. 3 illustrates a case where there are a route 1 and a route 2 to a destination 300 and a region 310, which the distance sensor 110 cannot recognize, is placed between the mobile robot 100 and the destination 300. In the case, as illustrated in the right diagram in FIG. 3, in a case where the route 2 is followed, a dead end 320 is placed in the unrecognizable region 310. The mobile robot 100 notices the dead end 320 when turning a corner 330, cannot reach the destination 300, and turns back.

Figure 4:
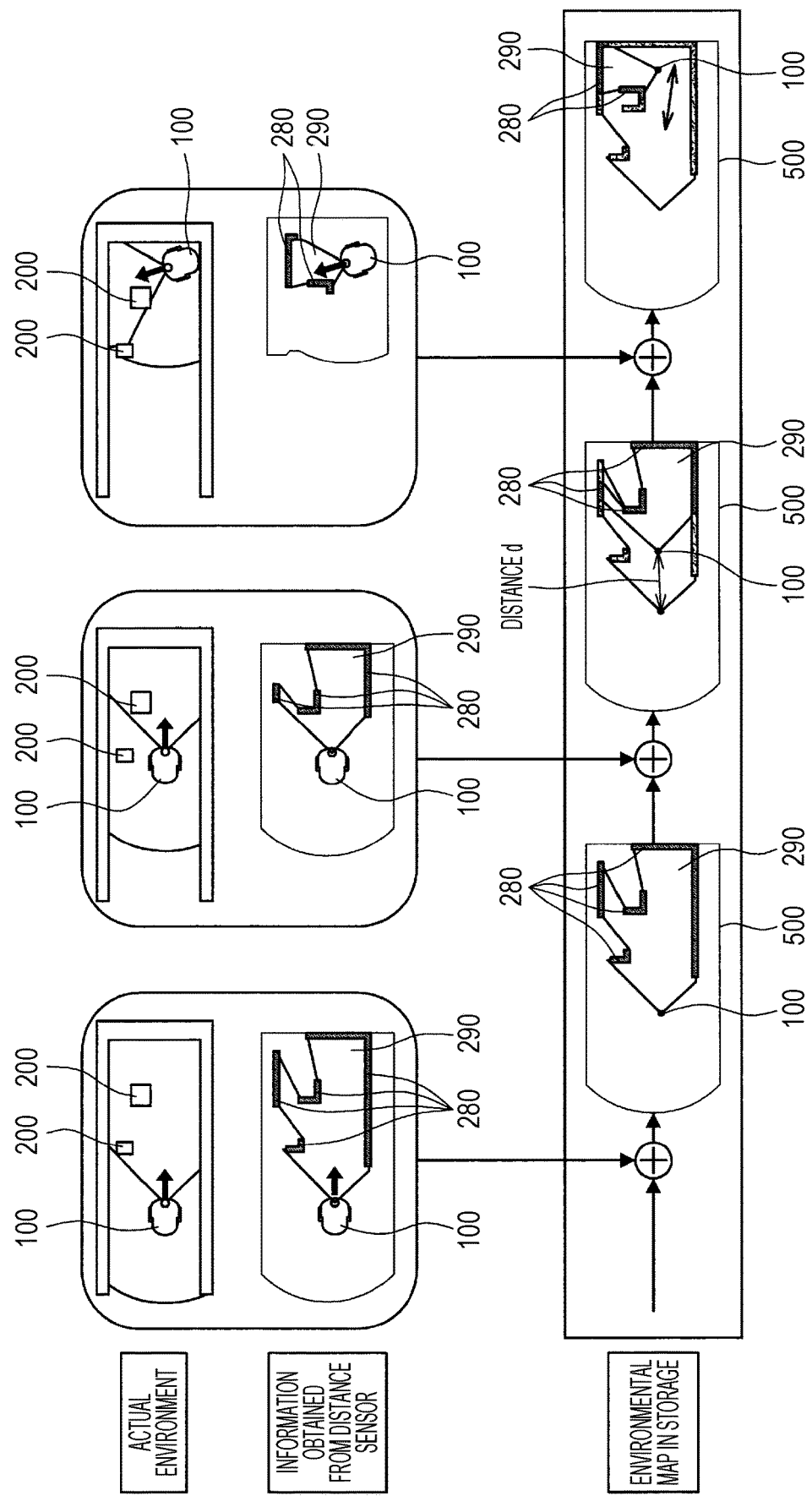
FIG. 4 is a schematic diagram illustrating how an actual environmental map is generated.

Consequently, the mobile robot 100 needs to store not only the current environmental information but past environmental information as the environmental information measured by the distance sensor 110. Here, a map generated by storing environmental information regarding a point where the mobile robot 100 was placed in the past is referred to as an environmental map. FIG. 4 is a schematic diagram illustrating how an actual environmental map is generated. FIG. 4 illustrates an actual environment around the mobile robot 100, information obtained from the distance sensor 110, and an environmental map 500 stored in the mobile robot 100 in order from the top.

As illustrated in FIG. 4, environmental information is obtained from the current output of the distance sensor 110 in accordance with the actual environment around the mobile robot 100. The environmental information includes information regarding the obstacle region 280 and information regarding the empty region 290. The mobile robot 100 accumulates the environmental map 500 basically by repeating operations of superimposing environmental information in accordance with the current output of the distance sensor 110 on the environmental map 500 that has been generated so far while shifting the environmental information by a movement distance d of the mobile robot 100.

It does not, however, mean that all pieces of past environmental information need to be stored on the environmental map 500. If all pieces of past environmental information 600 are accumulated and stored, the following problems d to f arise.

d. If all noises of the distance sensor 110 are left, space is full of obstacles 200

Figure 5:
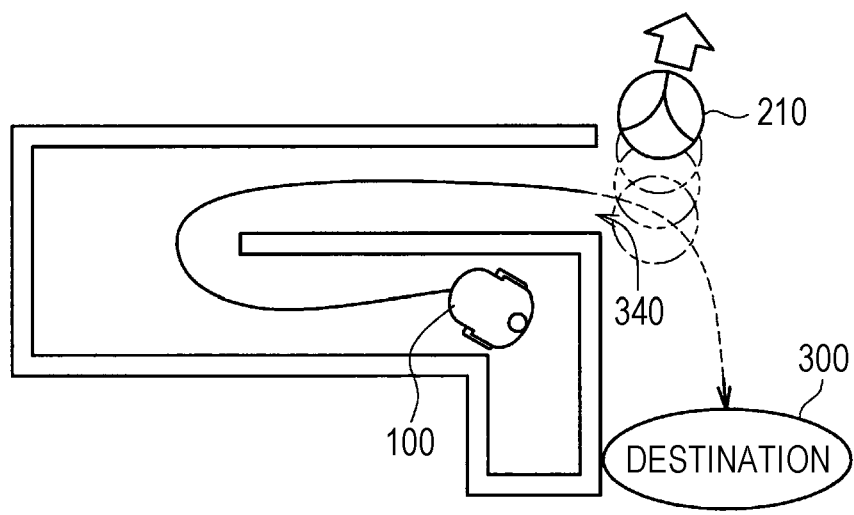
FIG. 5 is a schematic diagram illustrating harmful effects caused by continuing to store a far dynamic obstacle.
Figure 6:
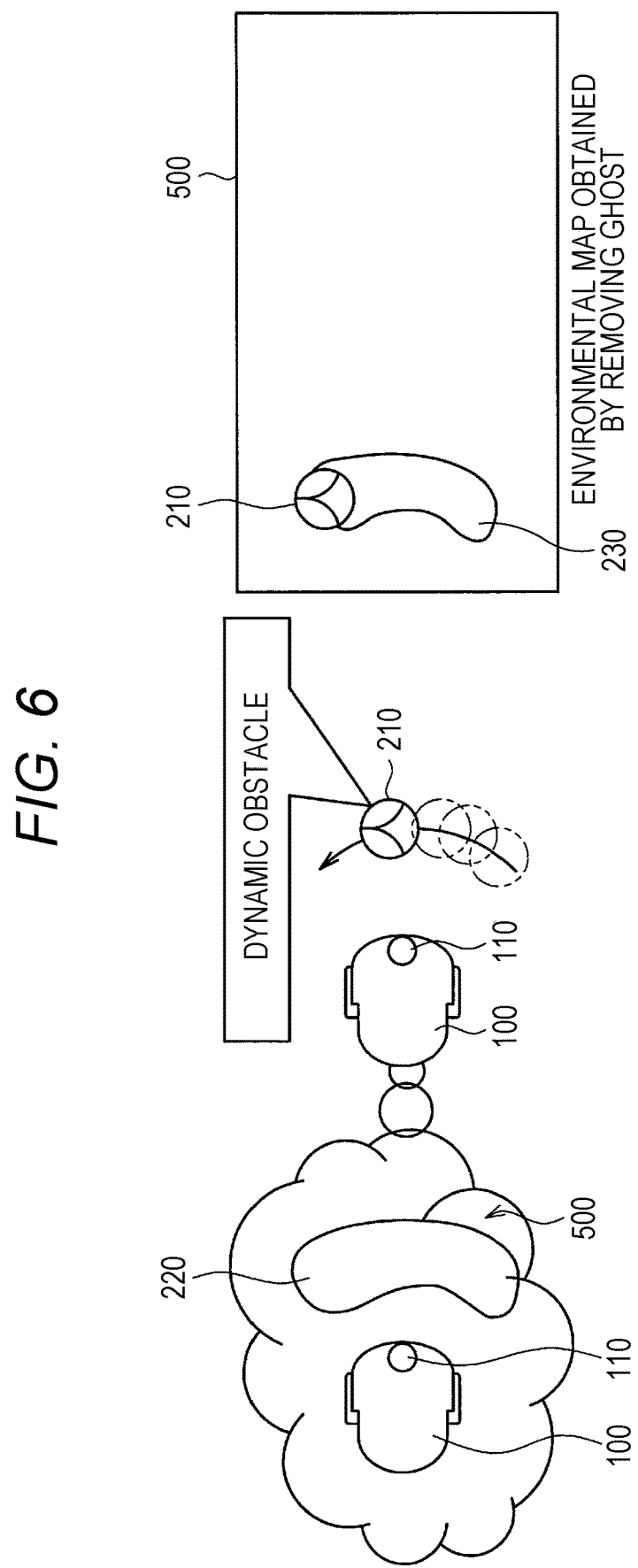
FIG. 6 is a schematic diagram illustrating an obstacle generated by continuing to store the dynamic obstacle.

If pieces of information regarding the obstacle region 280 caused by noise of the distance sensor 110 are left, the mobile robot 100 sees a route through which the mobile robot 100 can pass to be impassable. The mobile robot 100 is required to perform processing of not only holding information regarding the observed obstacle region 280 but updating the information regarding the obstacle region 280 at appropriate timing and erasing information regarding the non-existent obstacle region 280.

e. A movement route cannot be drawn due to an assumption that the far obstacle 200, which no longer exists, is left If the information regarding the far obstacle 200 outside the range of the distance sensor 110 is left without update, the place where the obstacle 200 existed is continued to be determined to be impassable even after the once-stored obstacle 200 disappears, so that a route may be generated incorrectly. An approach of erasing unnecessary information regarding the obstacle 200 in the invisible range is required.

f. In a case of long-distance movement, the environmental map 500 is endlessly expanded, leading to compression of a storage area Continuing to store the environmental map 500 without erasure leads to compression of a storage area such as a memory held by the mobile robot 100. FIG. 5 is a schematic diagram illustrating harmful effects caused by continuing to store a far dynamic obstacle 210. Since the mobile robot 100 stores the fact that, a person (dynamic obstacle 210) is at an exit 340 in storage, the mobile robot 100 cannot draw a route 3 to the destination 300. The fact that the person is at the exit 340 is in the past. If the mobile robot 100 continues to store the fact all the time, the obstacle 210 is left in the storage. For this reason, in a case where information, regarding the obstacle region 280, which has been obtained by an old observation and can no longer be trusted and information regarding the obstacle region 280 that is distant and unnecessary in the movement plan are erased, a storage area can be saved.

g. If a dynamic obstacle (such as a human) continues to be left, the dynamic obstacle is recognized as a wall If observation information regarding the moving obstacle 210 (dynamic obstacle) continues to be stored, the locus thereof is left as a huge obstacle 220 like a wall. FIG. 6 is a schematic diagram illustrating the obstacle 220 generated by continuing to store a dynamic obstacle. As illustrated in FIG. 6, if the dynamic obstacle 210 continues to be stored, the obstacle 220 like a wall remains in front of the mobile robot 100 in the environmental map 500 in storage of the mobile robot 100. Since a region 230 obtained by removing the current position of the obstacle 210 from the obstacle 220 is a ghost, the environmental map 500 is created by removing the ghost region 230 from the obstacle 220. As described above, a non-existent region needs to be removed from information regarding the obstacle region 280 at timing when the dynamic obstacle 210 is determined to no longer exist.

As described above, it is found that the environmental map 500 must be erased together with storage. In the embodiment, information, regarding the obstacle 200, unnecessary for setting a movement plan is erased in the mobile robot 100, which performs route planning while acquiring the environmental map 500 with the distance sensor 110. Details will be described below.

2. Configuration Example of System

Figure 7:
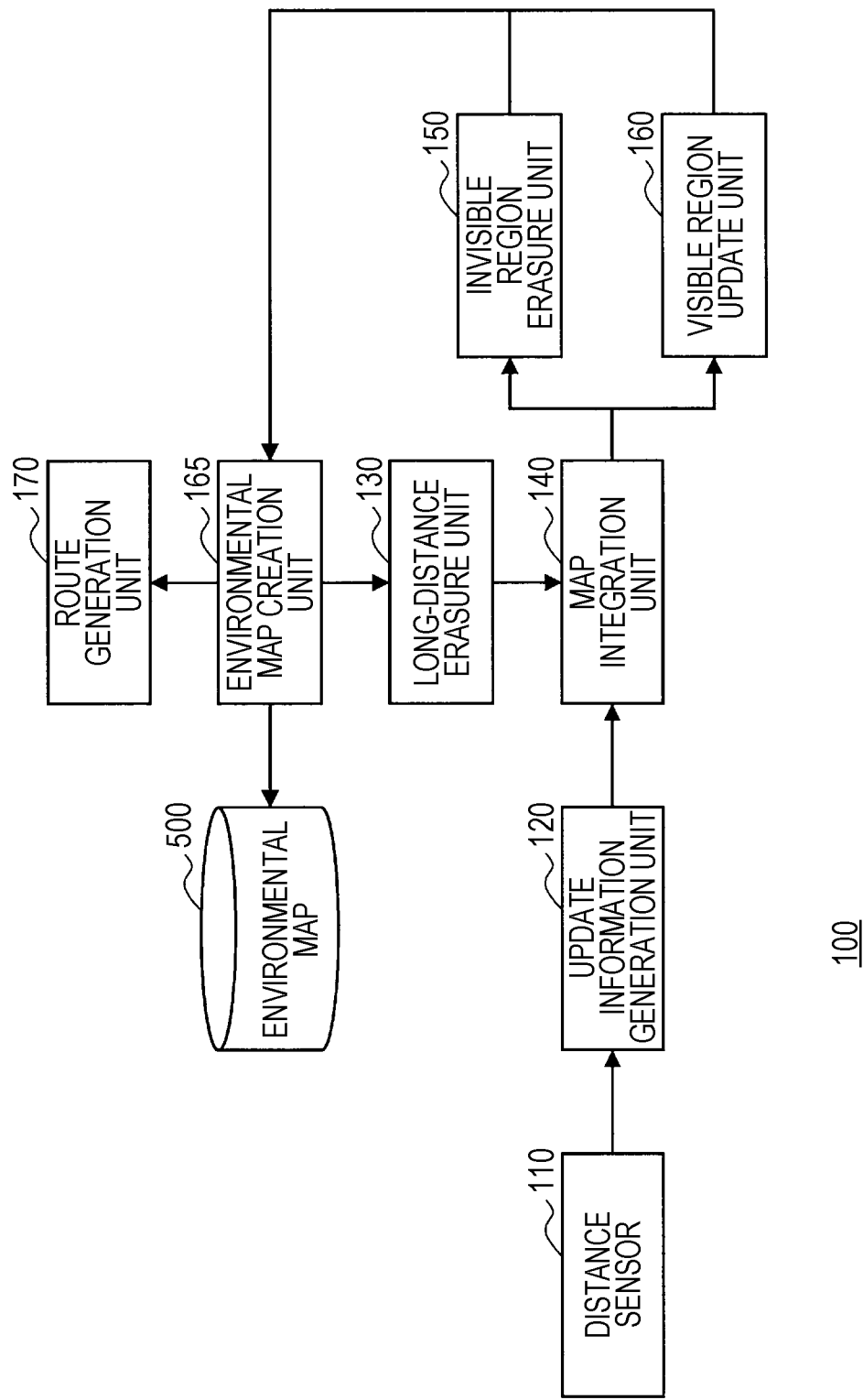
FIG. 7 is a schematic diagram illustrating the configuration of a system according to the embodiment.

FIG. 7 is a schematic diagram illustrating the configuration of a system according to the embodiment. The system relates to a system of the mobile robot 100 including the distance sensor 110, such as a stereo camera and a range sensor, which acquires distance information. Note that the system may be referred to as a host system.

As illustrated in FIG. 7, the mobile robot 100 includes the distance sensor 110, an update information generation unit 120, a long-distance erasure unit 130, a map integration unit 140, an invisible region erasure unit (invisible region erasure unit) 150, a visible region update unit (seen region update unit) 160, an environmental map creation unit 165, a route generation unit 170, and the environmental map 500. Note that each component other than the distance sensor 110 illustrated in FIG. 7 can be configured by hardware (circuit) or a central arithmetic processing apparatus such as a CPU and a program for causing this hardware or apparatus to function. In the case, the program can be stored in, for example, a storage medium such as a memory provided in the mobile robot 100 or a recording medium connected from the outside to the mobile robot 100.

The distance sensor 110 is a sensor for the host system to acquire information regarding the surrounding obstacle 200. As long as the distance sensor 110 can determine the position of the obstacle 200 and how far the obstacle 200 is from the mobile robot 100, the distance sensor 110 may be any type of sensor, such as a sensor that performs stereo matching by using a stereo camera, a sensor that measures a distance by using an IR camera, and a sensor that uses a laser range finder.

The update information generation unit 120 is a component that shapes the environmental information obtained by the distance sensor 110 into the size of the accumulated environmental map 500. In addition to the information regarding the obstacle region 280 and the empty region 290, which are visible regions, the update information generation unit 120 covers an invisible part with information regarding an unknown region.

The environmental map 500 is generated by accumulating outputs (environmental information) of the distance sensor 110 that has been obtained so far. The environmental map 500 holds the time when environmental information indicating each of the obstacle region 280 and the empty region 290 has been observed most recently for the same coordinates.

The long-distance erasure unit 130 is a component that reduces a storage area by trimming and erasing information regarding a part far from the mobile robot 100 in the integrated environmental map 500. The map integration unit 140 is a component that integrates the current environmental information output from the update information generation unit 120 and the trimmed environmental map.

The invisible region erasure unit 150 is a component that determines whether to, over time, erase or hold information regarding the obstacle region 280 and the empty region 290 that become invisible from the current position of the mobile robot 100 as a result of the map integration performed by the map integration unit 140. The visible region update unit 160 is a component that updates information regarding the obstacle region 280 and the empty region 290 that become visible from the current position of the mobile robot 100 as a result of the map integration.

The environmental map creation unit 165 creates the environmental map 500 by integrating the obstacle region 280, the empty region 290, and the unknown region after the processing performed by the invisible region erasure unit 150 and the visible region update unit 160. The environmental map 500 is stored in, for example, a memory in the mobile robot 100.

The route generation unit 170 is a component that generates a route, along which the mobile robot 100 should move, from the environmental map 500 obtained by combining the seen region and the invisible region obtained by the above-described processing. The route generation unit 170 generates a route so that the mobile robot 100 passes through the empty region 290 while avoiding the obstacle region 280.

3. Processing Performed in a System According to the Embodiment

Figure 8:
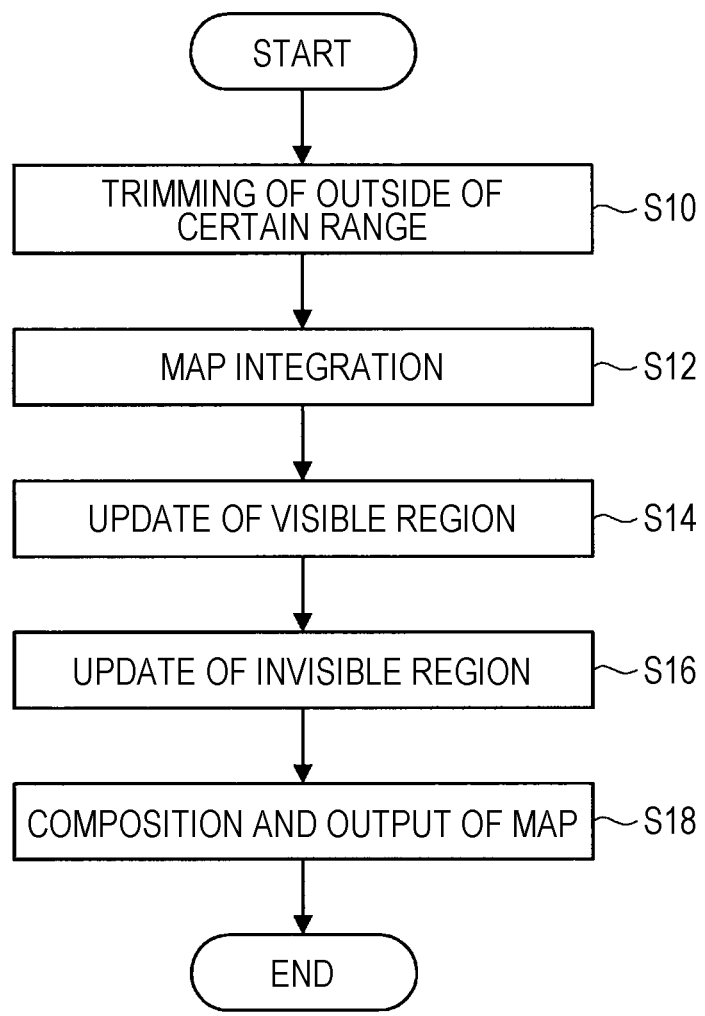
FIG. 8 is a flowchart illustrating processing performed in a system according to the embodiment.

Processing performed in a system according to the embodiment will be described below. The system integrates output of the distance sensor 110 into the environmental map 500, determines whether to erase or hold information in accordance with a distance from the mobile robot 100 and elapsed time, and updates the environmental map 500. As illustrated in FIG. 8, the processing performed in the system includes five steps of trimming of the outside of a certain distance range (Step S10), map integration (Step S12), update of a visible region (Step S14), update of an invisible region (Step S16), and composition and output of a map (Step S18).

3.1. Trimming of Outside of Certain Distance Range

In a case where the mobile robot 100 moves to the destination 300, even if the mobile robot 100 holds pieces of information regarding a place farther than the destination 300 and a path through which the mobile robot 100 has passed, there are cases where the pieces of information do not contribute to route planning. Furthermore, information that has been acquired earlier has low accuracy, and unnecessarily compresses the storage area. Consequently, in this step, the long-distance erasure unit 130 deletes environmental information regarding a place farther than a predetermined distance centered on the mobile robot 100 from the environmental map 500. Here, "deletion" means making an unknown region that is neither the empty region 290 nor the obstacle region 280, and simply means releasing (clearing) a storage area on a calculator.

The predetermined distance centered on the mobile robot 100 can be the longest distance to a goal point assumed in a place where the mobile robot 100 is applied.

3.2. Map Integration

In the step, environmental information obtained by the distance sensor 110 is reflected in the environmental map 500 for which the above-described trimming has been performed. In the environmental map 500, the times when the obstacle region 280 and the empty region 290 have been observed most recently are written in each coordinate on the map. In the environmental information obtained from the distance sensor 110, the current time is written for the coordinates where the obstacle region 280 and the empty region 290 have been detected. Written time is held for the coordinates in which neither the obstacle region 280 nor the empty region 290 have been detected and which are determined to be an unknown region.

3.3. Update of Visible Region

The visible region update unit 160 performs the step. The visible region update unit 160 updates the information regarding coordinates in which time is updated to the current time on the integrated environmental map 500. Processing for coordinates, which are observed to have previously been the empty region 290 but now be the empty region 290 as a result of observation, will first be described. Since the information indicating that the coordinates are the empty region 290 may be a noise of the distance sensor 110, it is not preferable to reflect the empty region 290 in the environmental map 500 as it is. Thus, reliability is improved by using the difference between the time when the obstacle region 280 has been observed most recently.

At the coordinates where, which are observed to have previously been the empty region 290 but now be the empty region 290, a time $t\_obs$ when the coordinates have been observed to be the obstacle region 280 is older than a time $t\_vcnt$ when the coordinates have been observed to be the empty region 290. That is, the following relation is established.

$$t\_obs < t\_vcnt = \text{current time}$$

Only in a case where the time difference $\Delta t = t\_obs - t\_vcnt$ is larger than a certain time $t\_m$, the coordinates are determined as the empty region 290. In this way, only in a case where the coordinates continue to be observed as the empty region 290 for a period longer than $t\_m$, the empty region 290 is reflected in the environmental map 500. In such a case, there is no need to doubt noise of the distance sensor 110.

Next, processing for coordinates, which are observed to have previously been the empty region 290 but now be the obstacle region 280 as a result of observation, will be described. Although the information indicating that the coordinates are the obstacle region 280 may also be noise of the distance sensor 110, it is desirable to reflect the obstacle region 280 in the environmental map 500 earlier than in a case where the coordinates are observed to be the empty region 290 considering the safety in movement of the mobile robot 100. Thus, in the case as well, the difference between the time $t\_vcnt$ when the coordinates have been observed to be the empty region 290 most recently and the time $t\_obs$ (current time) when the coordinates have been observed to be the obstacle region 280 is used. In a case where the time difference $\Delta t = t\_vcnt - t\_obs$ exceeds a time $t\_s$ shorter than the above-described time $t\_m$, the coordinates can be regarded as the obstacle region 280. As a result, the change from the empty region 290 to the obstacle region 280 is reflected more quickly, and the safety can be further secured.

Any method of determining the time widths $t\_m$ and $t\_s$ can be adopted as long as the relation of $t\_m > t\_s$ is satisfied. The time width $t\_m$ is also the time required until the ghost region 230 of the above-described dynamic obstacle 210 disappears. Inhibition of movement due to the ghost can be reduced by estimating $t\_m$ slightly on the basis of, for example, the size or movement speed of the dynamic obstacle in the situation where the system is applied. In a case where the distance sensor 110 has a large amount of noise or where the mobile robot 100 has a slow movement speed and the same coordinates are measured many times, $t\_s$ can be set longer. Conversely, $t\_s$ may be set to 0 in a case where the safety is desired to be pursued.

3.4. Update of Invisible Region

In the step, the information regarding coordinates in which time has not been updated on the integrated environmental map 500 is updated. The coordinates in which final observation time has not been updated are coordinates that have not been observed by the distance sensor 110, and correspond to a region currently invisible from the mobile robot 100. Since the information regarding the region is useful for route planning, the information is desired to be held for a certain period of time. The obstacle 200, however, may move in the invisible region, and the information becomes unreliable over time. Thus, in a case where the difference between a final observation time $t\_last$ and a current time $t\_now$ exceeds a certain time width $t\_l$, the invisible region erasure unit 150 erases the information. "Erasure" here means that the coordinates are registered as an unknown state that is neither an empty region nor an obstacle.

Therefore, the past information regarding the obstacle region 280 and the empty region 290 disappears at the time when the time width $t\_l$ has elapsed since the most recent observation. This means that the mobile robot 100 can continue to search for a route while holding the storage of information regarding surrounding environments only during the time width $t\_l$. The time width $t\_l$ should be set longer as a searching time permitted in terms of a movement speed of the mobile robot 100 and the size of environment to which the mobile robot 100 is applied.

Since the storage is reset after the time $t\_l$ has passed and searching is started again, the mobile robot 100 can address the case where the obstacle 210, which has been observed in the past in a searching range, moves during searching and a certain route becomes passable, and set a passable route. In a case of environment where the above-described moving obstacle 210 is not assumed, setting the time $t\_l$ to be infinite avoids the obstacle 210 from being erased over time, and enables searching to be continued until the destination is reached.

Furthermore, in a case where certain coordinates are determined to be the obstacle region 280 on the environmental map 500 and the obstacle region 280 changes to the empty region 290, the change is reflected after a time $t\_m$ has elapsed. Furthermore, in a case where the obstacle 200 becomes invisible, change to the unknown region is performed after the time $t\_l$ has elapsed. Setting $t\_m < t\_l$ causes the system to be characterized by the fact that "obstacle information is erased over time in the system, and in a case where an obstacle moves and an empty region occurs, information is rapidly updated".

Although, in the above-described example, the time $t\_l$ is set to a certain period of time, the larger $t\_l$ is, the larger the region that the mobile robot 100 should store may be, which is not preferable in terms of reducing storage areas. Thus, an approach of making the time width $t\_l$ variable for each coordinate in accordance with the movement speed and direction of a robot may be adopted. Note that variations thereof will be described later in detail.

3.5. Composition and Output of Map

In the step, the obstacle region 280 and the empty region 290 in the visible range and the invisible range are integrated, and the storage is updated as a new environmental map 500. The route generation unit 170 generates a route by using the updated environmental map 500.

4. Change of Obstacle Region and Empty Region in Accordance with Elapsed Time and Distance FIG. 9 is a schematic diagram illustrating how the obstacle region 280 and the empty region 290 change in accordance with elapsed time and a distance in each of a visible region and an invisible region on the basis of the above-described rule. In FIG. 9, the horizontal axis represents a distance, and the vertical axis represents time.

First, focusing on the visible region, as illustrated in FIG. 9, the visible region is relatively close in distance to the mobile robot 100, and characterized by update of information regarding the obstacle region 280 and the empty region 290. Even if determination as being the obstacle region 280 is performed at time 0, the determination is not immediately reflected in the environmental map 500. When t_s has elapsed since the determination as being the obstacle region 280, the obstacle region 280 is reflected in the environmental map 500. This can inhibit false recognition of the obstacle region 280 due to noise of the distance sensor 110.

Furthermore, even if determination as being the empty region 290 is performed at time 0, the determination is not immediately reflected in the environmental map 500. When t_m has elapsed since the determination as being the empty region 290, the empty region 290 is reflected in the environmental map 500. This can inhibit false recognition of the empty region 290 due to noise of the distance sensor 110. Furthermore, an increase in a storage amount caused by the ghost region 230 stored due to a dynamic obstacle can be inhibited.

Furthermore, satisfying the relation of t_m>t_s as described above causes the change from the empty region 290 to the obstacle region 280 to be quickly reflected in the environmental map 500, and the safety can be further secured. That is, the difference between times until disappearance causes the information at the same point to be held more easily the obstacle region 280 than in the empty region 290.

Next, focusing on the invisible region, the invisible region is relatively far in distance from the mobile robot 100, and both of the obstacle region 280 and the empty region 290 are erased after t_l has elapsed. That is, in a case where a correct route cannot be drawn in the time of t_l, the observation information is erased in chronological order.

Furthermore, in a case where the distance from the mobile robot 100 exceeds a predetermined value r, all pieces of information regarding the obstacle region 280 and the empty region 290 in the invisible region are erased.

5. Specific Examples of Update of Environmental Map

Next, a specific example of update of the environmental map 500 will be described with reference to FIGS. 10A to 10C. FIGS. 10A to 100 are schematic diagrams for illustrating creation of the environmental map 500, and illustrates a region, centered on the mobile robot 100, as seen from above, with the region being divided into 7×7=49 square regions 502. As illustrated in FIGS. 10A to 10C, the environmental map 500 includes an obstacle map 510 and an empty region map 520. The environmental map 500 is created by integrating the obstacle map 510 and the empty region map 520.

FIG. 10A illustrates the obstacle map 510, the empty region map 520, and the environmental map 500 in the past. Furthermore, FIG. 10B illustrates the obstacle map 510 and the empty region map 520 to which information from the distance sensor 110 is integrated. Furthermore, FIG. 10C illustrates the obstacle map 510, the empty region map 520, and the environmental map 500 to which the information from the distance sensor 110 is integrated and updated. FIGS. 10B and 10C illustrate a state after one second has elapsed from the state illustrated in FIG. 10A.

The coordinates of each region 502 are expressed as absolute values. In a case where the mobile robot 100 moves, the environmental information regarding each region 502 is updated in consideration of the movement amount. An example of a case where the mobile robot 100 does not move will be described below for convenience of explanation.

The numerical value illustrated in each region 502 indicates the time that has elapsed since observation. For example, in the obstacle map 510, a numerical value illustrated in a certain region 502 indicates an elapsed time (second) since the information regarding the obstacle region 280 has been obtained in the region. Similarly, in the empty region map 510, a numerical value illustrated in a certain region 502 indicates an elapsed time (second) since the information regarding the empty region 290 has been obtained in the region.

In the example illustrated in FIGS. 10A to 10C, the values of time parameters t_s, t_m, and t_l are t_s=two seconds, t_m=four seconds, and t_l=eight seconds, respectively.

At the time when obstacle map 510 and the empty region map 520 are integrated to create the environmental map 500, in a region 502 where values are written in both maps, numerical values (observation times) are compared to determine which of the obstacle region 280 and the empty region 290 is to be adopted. As a result, the environmental map 500 has dots indicating the obstacle region 280 and the empty region 290 in accordance with the result of the adoption. The obstacle region 280 has dots darker (denser) than the empty region 290. Furthermore, in the environmental map 500, a region without dots corresponds to an unknown region where both of the obstacle region 280 and the empty region 290 are not registered.

For example, in a region 502a illustrated in FIG. 10A, the obstacle map 510 has a numerical value of "0", and the empty region map 520 has a numerical value of "2". For this reason, it can be seen that the region 502a has been the empty region 290 two seconds before, and that the region 502a is currently the obstacle region 280. The time elapsed since the change to the obstacle region 280 is 2−0=2 (seconds), and the time elapsed since the change to the obstacle region 280 has reached an update time t_s (=two seconds). The obstacle region 280 is thus adopted as the state of the region 502a. Consequently, in the environmental map 500 illustrated in FIG. 10A, the region 502a is the obstacle region 280.

Furthermore, in a region 502b illustrated in FIG. 10, the obstacle map 510 has a numerical value of "3", and the empty region map 520 has a numerical value of "2". For this reason, it can be seen that the region 502b has been the obstacle region three seconds before, and that the region 502b currently the empty region. The time elapsed since the change to the empty region region is 2−0=2 (seconds), and the time elapsed since the change to the empty region is smaller than an update time t_m (=four seconds). The obstacle region 280 is thus adopted as the state of the region 502a. Consequently, in the environmental map 500 illustrated in FIG. 10A, the region 502b is the obstacle region.

In FIG. 10B, the current information obtained by the distance sensor 110 is integrated into the obstacle map 510, the empty region map 520, and the environmental map 500 in the past in the past illustrated in FIG. 10A. In FIG. 10B, the current latest observation information 530 obtained by the distance sensor 110 is illustrated in the left of the obstacle map 510. The observation information 530 corresponds to the central 3×3=9 regions 502 out of the 7×7=49 regions 502.

At the time of integration, the latest observation information 530, regarding the surroundings of the mobile robot 100, obtained from the distance sensor 110 is reflected in the obstacle map 510 and the empty region map 520. Then, this causes the region 502 having a numerical value of "0" to be generated. Note that, in FIG. 10B, since the upper left region 502 of the observation information 530 is an unknown region, the eight regions 502 excluding the upper left region 502 out of the observation information 530 are reflected in the obstacle map 510 and the empty region map 520.

For example, regarding a region 502c of FIG. 10B, neither the obstacle region nor the empty region is registered in FIG. 10A. At the time when one second has elapsed from FIG. 10A, however, information regarding the obstacle region 280 has been observed by the distance sensor 110 as illustrated in the observation information 530 in FIG. 10B. Consequently, in the obstacle map 510 in FIG. 10B, the region 502c is registered as the obstacle region 280, and given a numerical value of "0". At this time, in a region 502d that has already been determined as the obstacle region 280 in FIG. 10A, the already given numerical value is updated to "0".

Furthermore, the region 502d of the observation information 530 in FIG. 10B is observed to be the empty region 290. For this reason, in the empty region information 520 in FIG. 10B, the region 502d is registered as an empty region, and given a numerical value of "0". At this time, in a region 502d that has already been determined as the empty region 290 in FIG. 10A, the already given numerical value is updated to "0".

Furthermore, in the obstacle map 510 and the empty region map 520 in FIG. 10B, one second has elapsed since the state in FIG. 10A in the region 502, to which a numerical value is given in FIG. 10A and for which the observation information 530 gives no update, and thus the numerical value is increased only by one.

The obstacle map 510 and the empty region map 520 illustrated in FIG. 10C are similar to those in FIG. 10B. As illustrated in FIG. 10C, the obstacle map 510 and the empty region map 520 are integrated to create the environmental map 500.

For example, in a region 502e illustrated in FIG. 10C, the obstacle map 510 has a numerical value of "4", and the empty region map 520 has a numerical value of "0". For this reason, it can be seen that the region 502e has been the obstacle region 280 four seconds before, and that the region 502e is currently the empty region 290. The time elapsed since the change to the empty region 290 is 4−0=4 (seconds), and the time elapsed since the change to the empty region 290 reaches an update time t_m (=four seconds). The empty region 290 is thus adopted as the state of the region 502e. Consequently, in the environmental map 500 illustrated in FIG. 10C, the region 502e is the empty region 290.

Furthermore, in a case of creating the environmental map 500 illustrated in FIG. 10C, a region 502f having a numerical value of "eight" reaches t_l=8 seconds, so that the region 502f is registered as an unknown region that is neither the obstacle region 280 nor the empty region 290.

As described above, in the updated environmental map 500 illustrated in FIG. 10C, the environmental map 500 is updated on the basis of the observation information 530 regarding a region visible to the distance sensor 110. Furthermore, a region that changes to an unknown region by a numerical value that has been increased only by one appears out of regions invisible to the distance sensor 110.

Note that FIGS. 10A to 10C do not contain processing performed by the long-distance erasure unit 130. The long-distance erasure unit 130 trims and erases information regarding a part far from the mobile robot 100 in the environmental map 500 generated by the processing illustrated in FIGS. 10A to 10C.

6. How to Determine Each Parameter

An example of how to determine each parameter will be described below.

6.1. How to Determine Predetermined Value r

Figure 12:
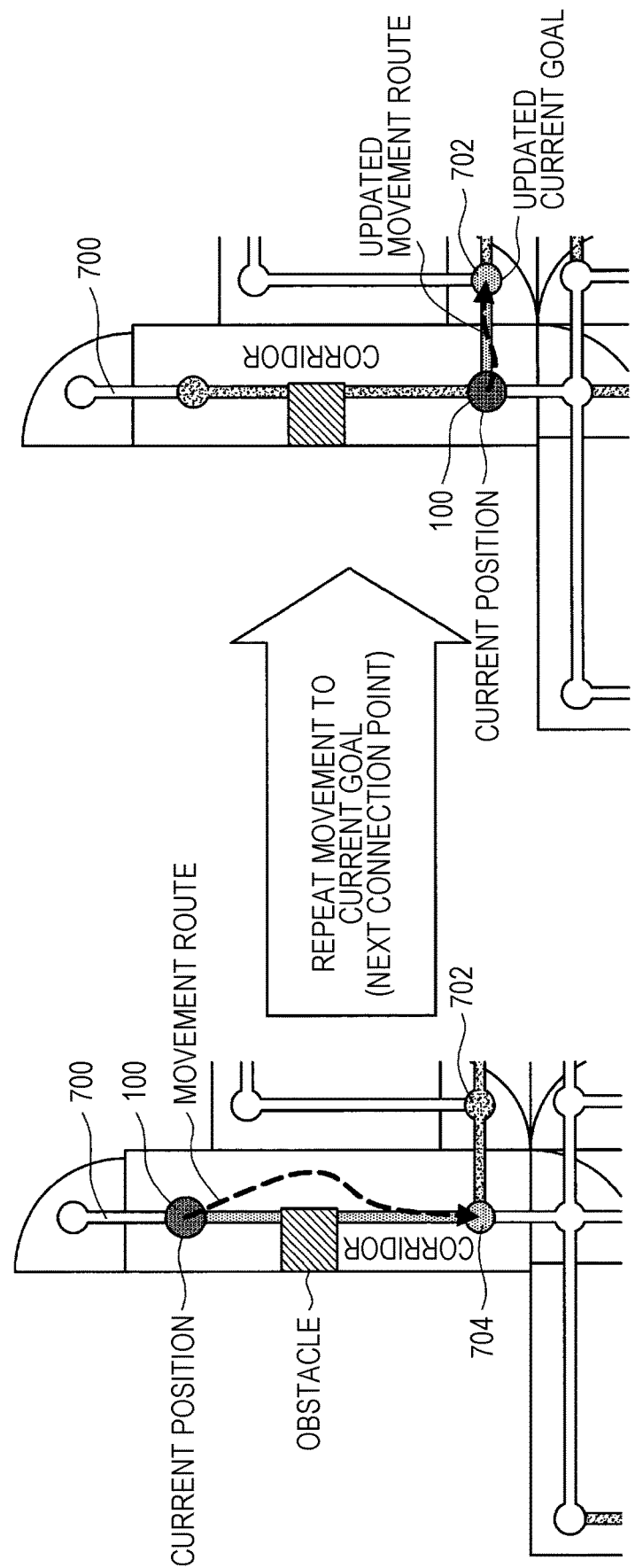
FIG. 12 is a schematic diagram illustrating how the mobile robot moves on the topological map, and illustrating the mobile robot and the route as seen from above.
Figure 13:
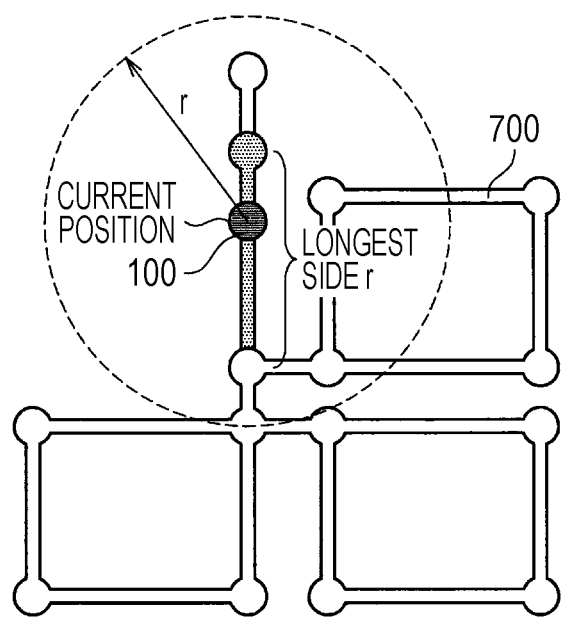
FIG. 13 is a schematic diagram illustrating a range of an environmental map to be stored by the mobile robot.

FIGS. 11 to 13 are schematic diagrams for describing how to determine a distance (predetermined value r) that serves as a trigger for erasing information regarding the obstacle region 280 and the empty region 290. FIG. 11 is a schematic diagram illustrating a floor plan 750 (left diagram) of rooms and a corridor of movement space of the mobile robot 100 and a topological map 700 (right diagram) corresponding to the floor plan 750. The topological map 700 is a map in which, for example, information regarding connection between rooms of movement space of the mobile robot 100 and information regarding connection between rooms and a corridor are written. In the topological map 700 illustrated in FIG. 11, the floor plan 750 is illustrated by being superimposed with a broken line.

FIG. 12 is a schematic diagram illustrating how the mobile robot 100 moves on the topological map 700, and illustrates the mobile robot 100 and the route as seen from above. FIG. 12 illustrates the vicinity of the corridor of the floor plan 750 illustrated in FIG. 11 and the topological map 700 corresponding thereto. In a case of moving to the destination 300, the mobile robot 100 does not generate a movement route to a final goal 702 at a time, but sets the next connection point 704 as the current goal, and moves to the next connection point 704. The mobile robot 100 reaches the final goal 702 by repeating the movement to the next connection point.

When the mobile robot 100 reaches the current goal (connection point 704), the movement route of the mobile robot 100 is switched to that to the next goal (final goal 702). At that time, if the mobile robot 100 does not return, the information regarding the environmental map 500 up to that point is unnecessary.

Consequently, as illustrated in FIG. 13, it is sufficient if the range of the environmental map 500 to be stored by the mobile robot 100 includes a "circle whose radius is the length of the longest side" on the topological map 700. The circle having a radius of r completely includes the movement route. It is thus sufficient if the mobile robot 100 stores the obstacle region 280 and the empty region 290 in the range of the circle.

6.2. How to Determine t_m

Next, how to determine t_m will be described. Here, how to determine t_m on the basis of tracking a person will be described. As described above, t_m is the time until the obstacle region 280 changes to the empty region 290.

Here, in a case where the following expression (1) is established, the obstacle region 280 is switched to the empty region 290 on the environmental map 500. In a case where a sensor signal is unreliable, the change from the obstacle region 280 to the empty region 290 may cause collision of the mobile robot 100. For this reason, as described above, t_m is desirably larger than the time t_s used for the recognition change in the opposite case (empty region 290 to obstacle region 280).

$$t\_m < \text{(time when the observation as the obstacle region 280 is performed most recently)} - \text{(time when the observation as the empty region 290 is performed most recently)} \quad (1)$$

Figure 14:
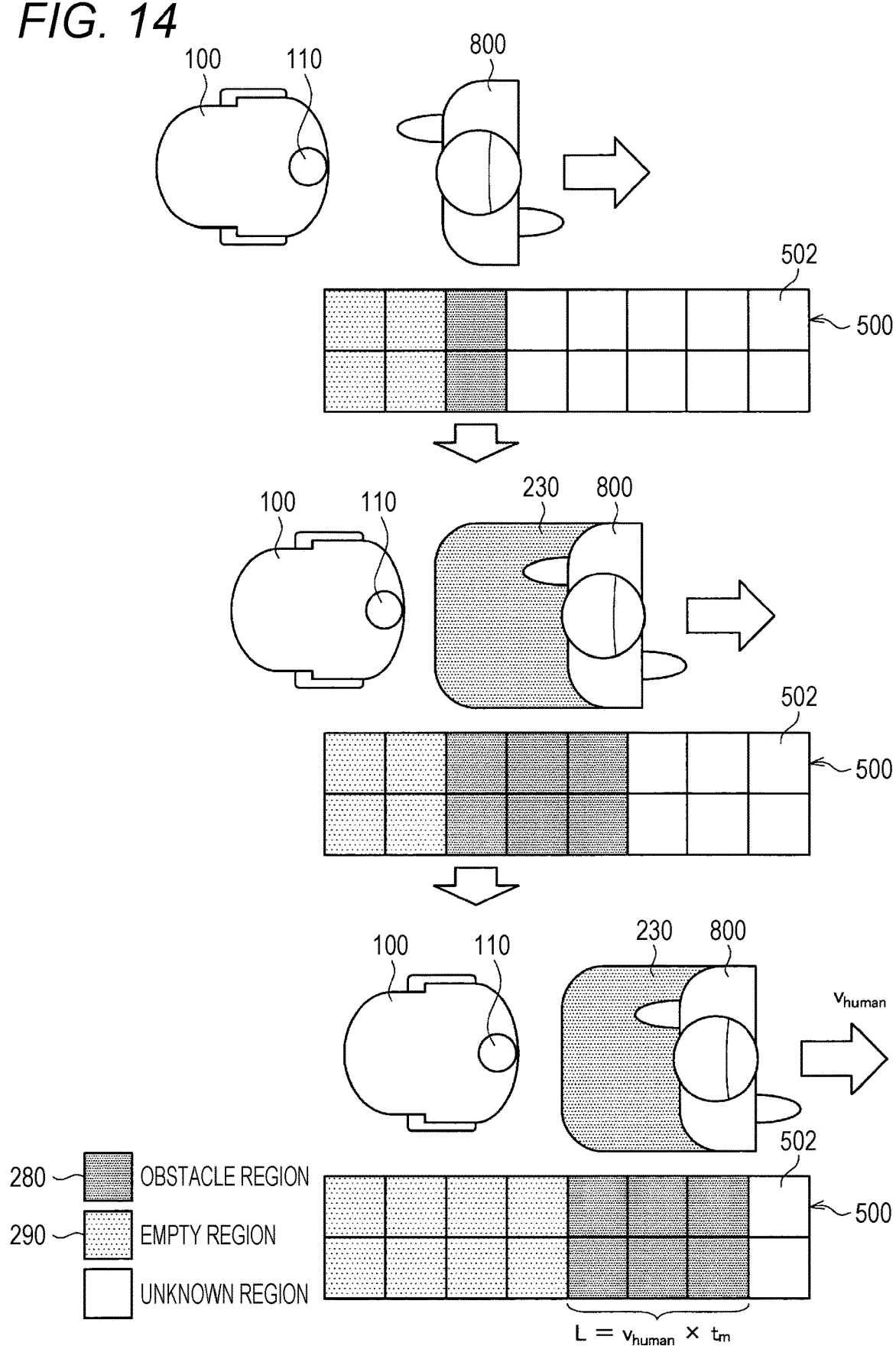
FIG. 14 is a schematic diagram illustrating the mobile robot that moves tracking a person.

Meanwhile, FIG. 14 illustrates the mobile robot 100 that moves tracking a person 800. The upper diagram in FIG. 14 illustrates the obstacle region 280 and the empty region 290 behind the person 800 in a case where the person 800 and the mobile robot 100 remain still. Furthermore, in contrast to the upper diagram, the middle diagram in FIG. 14 illustrates the obstacle region 280 and the empty region 290 behind the person 800 in a case where the person 800 starts moving and the mobile robot 100 tracks the person 800. Furthermore, in contrast to the middle diagram, the lower diagram in FIG. 14 illustrates the obstacle region 280 and the empty region 290 behind the person 800 in a case where the person 800 and the mobile robot 100 further move.

As illustrated in the middle and lower diagrams in FIG. 14, in a case where the mobile robot 100 tracks the person 800, a track of the person 800 continues to remain in storage of the mobile robot 100 as the obstacle region 280 (ghost region 230) for the time of t_m. For example, in a case where a target to be tracked is moving at a person 800 speed v_human, a length L of a ghost can be expressed by the following expression (2).

$$L = v\_\text{human} \times t\_m \quad (2)$$

As described above, the length L of a ghost is changed in accordance with t_m. In a case where t_m is large, the obstacle region 280 (ghost region 230) accordingly continues to remain behind the person 800. The mobile robot 100 has difficulty in smoothly tracking the person 800.

Then, t_m can be determined by the following expression (3) by using Expression (2) in reverse.

$$t\_m = L\_h / v\_\text{robot} \quad (3)$$

Note, however, that, in Expression (3), L_h is an ideal distance between a robot and a person in a case where the person 800 is tracked, and v_robot is the maximum speed of the mobile robot 100 at the time of tracking.

6.3. How to Determine t_l

Next, how to determine t_l, which is the disappearance time of the obstacle region 280 in a range that cannot be observed by the distance sensor 110 will be described. As described above, in a case where t_l has elapsed since the most recent observation of information regarding a certain region 502, the information regarding the region 502 is reset, and the region 520 changes to an unknown region. That is, the region 502 is neither the obstacle region 280 nor the empty region 290. Specifically, in a mathematical expression, the region 502 that satisfies the following expression (4) is reset to an unknown region. Note that, in Expression (4), t_l is indicated as t_l$_0$ in order to indicate that t_l is a fixed value, $$t\_l_0 \leq \Delta t (= t - t\_0) \quad (4)$$

Note, however, that, in Expression (4), t_0 is the time when the obstacle region 280 and the empty region 290 are observed most recently in the region 502, and t is the current time.

Although t_l$_0$ in Expression (4) is a fixed value, an approach more effective for saving a storage area can be adopted in consideration of the movement speed and movement direction of the mobile robot 100. For example, in a case where the mobile robot 100 is moving at a high speed, the mobile robot 100 moves away from the past obstacle 200, and thus the value of t_l does not need to be increased so much. In contrast, in a case where the mobile robot 100 is moving at a low speed, a case where a route is carefully searched for is assumed, and it is considered that information regarding the vicinity is desired to be held as much as possible. Thus, the time t_l can be increased or decreased in accordance with the integrated value of the movement speed of the robot until then. In a case where the mobile robot is moving at a high speed, t_l is decreased, and the environmental information is rapidly erased. Furthermore, in a case where the mobile robot is moving at a low speed, the environmental information is held for a long time by increasing t_l. Furthermore, in a case where the mobile robot 100 is stopped, there is no concern that the environmental map 500 is expanded. The time t_l is thus set to be infinite, and a system in which the environmental information does not disappear over time may be adopted.

Specifically, FIG. 15 is a schematic diagram illustrating erasure of information regarding the obstacle region 280 in accordance with the speed of the mobile robot 100. As illustrated in the upper diagram in FIG. 15, in a case where the mobile robot 100 is moving at high speed, the place where the mobile robot 100 was in the past rapidly becomes farther. The information regarding the obstacle region 280 in an unobservable range does no longer need to be held. Furthermore, as illustrated in the lower diagram in FIG. 15, in a case where the mobile robot 100 remains still, there is no possibility that the environmental map 500 is expanded, and thus the information regarding the obstacle region 280 in the unobservable range is sometimes not required to be erased.

Then, as illustrated in Expression (5), Expression (4) may be modified, a correction term based on speed may be added to t_l$_0$, and the value of t_l may be set to a value (=t_l$_{vel}$) that changes in response to the speed.

[Math. 1]

$$t\_l_{vel} = t\_l_0 - \int_{t_0}^{t} a|v| - 1 \, dt \leq \Delta t \quad (5)$$

The value of t_l$_{vel}$, which is obtained by adding a speed element to t_l$_0$ as illustrated in Expression (5), is decreased in a case where the mobile robot 100 has a fast movement speed. In a case where the mobile robot 100 has a fast movement speed, the environmental map 500 in the unobservable range is rapidly reset. In contrast, in a case where the mobile robot 100 remains still, $t\_l_{vel}$ increases, and the obstacle region 280 becomes harder to disappear over time.

Furthermore, means for increasing/decreasing t_l by using the movement direction of the mobile robot 100 may be adopted. In a case where the mobile robot 100 is going straight in a certain direction, the information regarding the back of the mobile robot 100 is unnecessary. If setting, in which t_l of coordinates behind the posture of the mobile robot 100 is decreased and forward t_l is increased, is made, a storage area can be efficiently reduced even at the time of such linear movement. In a case where the mobile robot 100 moves while searching for a route having a complicated shape by such setting, the posture of the mobile robot 100 is expected to be frequently rotated, and thus t_l is desirably averaged over all directions.

Specifically, an approach of changing t_l by using speed and orientation will be described. In consideration of not only the magnitude of a speed but a movement direction, t_l can be changed. As illustrated in FIG. 16, information regarding the obstacle region 280 in a traveling direction of the mobile robot 100 may be used in route planning of the mobile robot 100. For this reason, waste of observation may be prevented by causing the information regarding the obstacle region 280 in the traveling direction not to disappear.

In contrast, the information regarding the obstacle region 280 in the back of the mobile robot 100 is likely not to be used since the mobile robot 100 moves away from an obstacle. For this reason, holding information regarding the obstacle region 280 in the back of the mobile robot 100 is useless, and the information is erased early.

Then, as illustrated in Expression (6) below, a correction term may be added to $t\_l_0$ in simultaneous consideration of a speed and a movement direction, and the value of t_l may be set to a value ($=t\_l_{dir}$) that changes in response to the speed and the movement method.

[Math. 2]

$$t\_l_{dir} = t\_l_0 - k \int_{t_0}^{T} |\overrightarrow{v_{robot}} \cdot \overrightarrow{e_{point}} - 1| dt \le \Delta t \quad (6)$$

Note, however, that $\overrightarrow{e_{point}}$ in Expression (6) is a unit vector from the mobile robot 100 to the region 502 for determining erasure.

As described above, the two approaches for changing t_l are derived from the approach of fixing t_l, and the above-described two approaches can be applied at the same time.

As described above, according to the embodiment, the invention can be implemented by a high-speed image processing approach such as mask processing on the environmental map 500 and matrix sum calculation, and can be achieved at a cost lower than that in high-load processing such as object identification and probabilistic handling in a traditional approach. As a result, according to the embodiment, the invention can be achieved also to a small object with limited computing power, such as a domestic pet robot.

Furthermore, in a case where the invention is applied to a home environment, it is assumed that the positions of static obstacles, such as luggage placed on a floor and scattered toys, are frequently changed. The approach of selectively erasing a dynamic obstacle after identifying a dynamic obstacle and a static obstacle cannot adequately address these moving static obstacles, which results in narrowing a movement range. According to the embodiment, however, storage is erased by the same standard without distinguishing the static obstacle and the dynamic obstacle. An action can be performed without receiving restriction caused by the movement of the static obstacle.

Moreover, in a traditional approach, an invisible point (point that is not re-observed) may continue to remain with a certain existence probability. The environmental map may gradually be expanded, and compress a storage area. According to the embodiment, an invisible obstacle is aggressively erased, and the storage area can be effectively saved.

The preferred embodiment of the disclosure has been described in detail above with reference to the accompanying drawings, but the technical scope of the disclosure is not limited to such an example. It is obvious that a person having ordinary skill in the art of the disclosure can arrive at various alternations or modifications within the scope of the technical ideas set forth in the claims. These alternations or modifications are understood to naturally fall within the technical scope of the disclosure.

Furthermore, the effects described herein are merely illustrative or exemplary, and not limitative. That is, the technique according to the disclosure may have other effects that are obvious to a skilled person from the description of the specification, together with or in place of the above-described effects.

Note that, the configurations as described below also fall within the technical scope of the disclosure.

(1) An environmental information update apparatus including an update unit that updates information regarding an obstacle region and information regarding an empty region, an obstacle existing in space where a mobile body moves in the obstacle region, the obstacle not existing in the empty region, in which the update unit updates the obstacle region, and updates the empty region on the basis of different periods of elapsed time.

(2) The environmental information update apparatus according to (1), in which the update unit updates a region for which information regarding the obstacle region has been obtained as the obstacle region after a first period of time has elapsed, and updates a region for which information regarding the empty region has been obtained as the empty region after a second period of time has elapsed, and the second period of time is longer than the first period of time.

(3) The environmental information update apparatus according to (1) or (2), further including an invisible region erasure unit that erases information regarding the obstacle region or the empty region in a region unobservable from the mobile body after a predetermined period of time has elapsed since the information regarding the obstacle region or the empty region was obtained.

(4) The environmental information update apparatus according to (3), in which the predetermined period of time is changed in accordance with movement speed of the mobile body.

(5) The environmental information update apparatus according to (3), in which the predetermined period of time is shortened as movement speed of the mobile body is increased.

(6) The environmental information update apparatus according to (3), in which the predetermined period of time is changed in accordance with a movement direction of the mobile body.

(7) The environmental information update apparatus according to (3), in which the predetermined period of time is shortened as a movement direction of the mobile body moves away from a position of the obstacle region or the empty region.

(8) The environmental information update apparatus according to (3), in which the predetermined period of time is changed in accordance with movement speed and a movement direction of the mobile body.

(9) The environmental information update apparatus according to any one of (1) to (8), further including a long-distance erasure unit that erases information regarding the obstacle region and the empty region positioned in a place a predetermined value or more away from the mobile body.

(10) The environmental information update apparatus according to any one of (1) to (9), further including an environmental map creation unit that creates an environmental map on the basis of updated information regarding the obstacle region and the empty region.

(11) The environmental information update apparatus according to (10), further including a route generation unit that generates a route along which the mobile body moves on the basis of the environmental map.

(12) The environmental information update apparatus according to any one of (1) to (11), in which information regarding the obstacle region and the empty region is observed by a sensor mounted in the mobile body.

(13) An environmental information update method including
updating information regarding an obstacle region and information regarding an empty region, an obstacle existing in space where a mobile body moves in the obstacle region, the obstacle not existing in the empty region, in which
updating the obstacle region and updating the empty region are performed on the basis of different periods of elapsed time.

(14) A program causing a computer to function as:
means for updating information regarding an obstacle region and information regarding an empty region, an obstacle existing in space where a mobile body moves in the obstacle region, the obstacle not existing in the empty region; and
means for updating the obstacle region, and updating the empty region on the basis of different periods of elapsed time.

REFERENCE SIGNS LIST

100 Mobile body
120 Update information generation unit
120 Long-distance erasure unit
150 Invisible region erasure unit
160 Visible region update unit
165 Environmental map generation unit
170 Route generation unit
500 Environmental map

The invention claimed is:

1. An environmental information update apparatus comprising:
an update unit that updates information regarding an obstacle region and information regarding an empty region, an obstacle existing in space where a mobile body moves in the obstacle region, the obstacle not existing in the empty region; and
an invisible region erasure unit that erases information regarding the obstacle region or the empty region in a region unobservable from the mobile body after a predetermined period of time has elapsed since the information regarding the obstacle region or the empty region was obtained,
wherein the update unit updates the obstacle region, and updates the empty region on a basis of different periods of elapsed time.

2. The environmental information update apparatus according to claim 1, wherein
the update unit
updates a region for which information regarding the obstacle region has been obtained as the obstacle region after a first period of time has elapsed, and
updates a region for which information regarding the empty region has been obtained as the empty region after a second period of time has elapsed, and
the second period of time is longer than the first period of time.

3. The environmental information update apparatus according to claim 1, wherein the predetermined period of time is changed in accordance with movement speed of the mobile body.

4. The environmental information update apparatus according to claim 1, wherein the predetermined period of time is shortened as movement speed of the mobile body is increased.

5. The environmental information update apparatus according to claim 1, wherein the predetermined period of time is changed in accordance with a movement direction of the mobile body.

6. The environmental information update apparatus according to claim 1, wherein the predetermined period of time is shortened as a movement direction of the mobile body moves away from a position of the obstacle region or the empty region.

7. The environmental information update apparatus according to claim 1, wherein the predetermined period of time is changed in accordance with movement speed and a movement direction of the mobile body.

8. The environmental information update apparatus according to claim 1, further comprising a long-distance erasure unit that erases information regarding the obstacle region and the empty region positioned in a place a predetermined value or more away from the mobile body.

9. The environmental information update apparatus according to claim 1, further comprising an environmental map creation unit that creates an environmental map on a basis of updated information regarding the obstacle region and the empty region.

10. The environmental information update apparatus according to claim 9, further comprising a route generation unit that generates a route along which the mobile body moves on a basis of the environmental map.

11. The environmental information update apparatus according to claim 1, wherein information regarding the obstacle region and the empty region is observed by a sensor mounted in the mobile body.

12. An environmental information update method comprising:
updating information regarding an obstacle region and information regarding an empty region, an obstacle existing in space where a mobile body moves in the obstacle region, the obstacle not existing in the empty region;

erasing information regarding the obstacle region or the empty region in a region unobservable from the mobile body after a predetermined period of time has elapsed since the information regarding the obstacle region or the empty region was obtained; and updating the obstacle region and updating the empty region are performed on a basis of different periods of elapsed time.

13. A non-transitory computer-readable medium having embodied thereon a program, which when executed by a computer causes the computer to execute a method, the method comprising:

updating information regarding an obstacle region and information regarding an empty region, an obstacle existing in space where a mobile body moves in the obstacle region, the obstacle not existing in the empty region;

erasing information regarding the obstacle region or the empty region in a region unobservable from the mobile body after a predetermined period of time has elapsed since the information regarding the obstacle region or the empty region was obtained; and updating the obstacle region, and updating the empty region on a basis of different periods of elapsed time.

* * * * *